IRVING B. LUECK
CLARENCE A. SHELD
INVENTORS 3,471,358
LAMINATION OF SILICATE SURFACES USING AN IMPREGNATED PHENOXY RESIN INTERLAYER
Irving B. Lueck, Perinton, and Clarence A. Sheld, Irondequoit, N.Y., assignors to Bausch & Lomb Incorporated, Rochester, N.Y., a corporation of New York
Filed Feb. 16, 1966, Ser. No. 527,802
Int. Cl. B32b 17/08, 31/26
U.S. Cl. 161—192   6 Claims

ABSTRACT OF THE DISCLOSURE

Disclosed is a method for laminating silicate sheets comprising impregnating a phenoxy resin film with a catalyst and a monomer disposing the impregnated film between the silicate sheets and thereafter polymerizing the monomer in situ. The method lends itself to fabricating safety plate glass and safety ophthalmic lenses of excellent optical quality.

---

Figure 1:
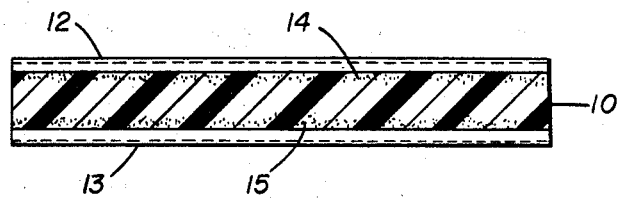

This invention relates to lamination of silicate materials such as glass. In particular this invention provides a novel method for bonding glass surfaces by interposing a phenoxy resin film between the layers and polymerizing a monomer which has been impregnated into the phenoxy resin surface. This invention also comprises novel safety lenses wherein curved glass lens members are secured in a laminate arrangement using an intermediate film of impregnated phenoxy resin.

A film of aromatic poly(hydroxyether) may be used as a bonding medium between layers of silicate material. However, difficulties have been found in laminating surfaces such as silicate glass, mica etc. Such aromatic poly(hydroxyethers) are of the general structure

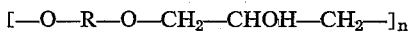

in which the dihydricphenol moiety R is bisphenol A, resorcinol or other dihydric phenol. Present polyhydroxyethers commercially available are copolymers of bisphenol A and epichlorohydrin. This material is a thermoplastic resin which may be used as a bonding layer for silicate materials by heating the laminate under pressure at about 400° F. for several minutes. Particular difficulty has been encountered in the use of these resins in making laminated safety lenses, especially for ophthalmic use. These safety lenses have curved surfaces and the thermoplastic interlayer frequently contains bubbles or wrinkles resulting in an unsatisfactory lens.

It has been discovered that silicate materials may be bonded using a phenoxy resin film impregnated with a compatible monomer such as triallyl phosphate which is polymerized in situ. The monomer is absorbed into the surface of the phenoxy film and penetrates the film to some degree. The monomer-swollen film is then interposed between silicate layers and the monomer is cured or polymerized at moderate temperatures to complete the laminating process. Several monomers have been found which have the desired properties for use with the present invention. These monomers are liquids which in both the monomer and polymer state are compatible with phenoxy resin and are generally unsaturated organic esters and epoxy monomers. Of particular usefulness in the practice of this invention are monomers which are capable of rapidly disolving phenoxy resin and are in the class of allyl monomers such as allylacrylate and allylmethacrylate, allyl esters of phosphoric acid such as triallyl phosphate and diallyl phenyl phosphonate, and cycloaliphatic epoxide monomers such as 4-vinylcyclohexene dioxide. Monomers capable of dissolving phenoxy resin at a slow rate such as methyl methacrylate and butyl methacrylate, are preferably used as comonomers with the more active monomers.

Accordingly it is an object of this invention to provide novel methods and laminates wherein silicate layers are bonded by using a resin film consisting essentially of an aromatic poly(hydroxyether) having a second resin impregnated in the surface thereof and formed in situ from a monomer which has been contacted with the resin film. In particular, it is an object of this invention to provide a novel laminating method comprising the steps of contacting a phenoxy resin film consisting essentially of a copolymer of bis-phenol A and epichlorohydrin with a compatible liquid monomer which is absorbed in the surface of the resin film, and polymerizing the monomer in situ between layers of silicate material.

It is a further object of this invention to provide an improved laminated safety lens in which glass curved surfaces are bonded by a phenoxy resin having a second resin formed in situ and impregnated in the surface of the phenoxy resin.

Figure 2:
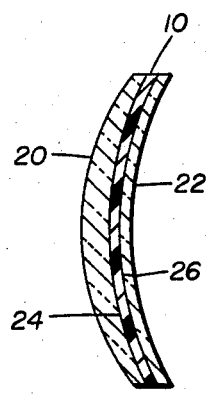

These and other objects and features of the invention will be apparent from the following description and drawing wherein FIGURE 1 is a cross-sectional view of a resin film having liquid monomer absorbed therein and, FIGURE 2 is a cross-sectional view of a laminated safety lens according to the present invention.

The novel method for laminating silicate materials such as glass has as its important feature the use of a monomer-impregnated thermoplastic film as an interlayer. The phenoxy resin used herein is a high molecular weight thermoplastic material which is a copolymer of bis-phenol A and epichlorohydrin having the molecular structure:

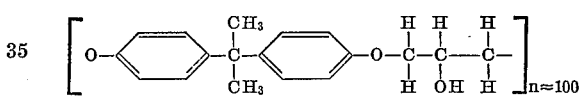

Typical properties of the resin: molecular weight= approximately 20,000 to 30,000, specific gravity=about 1.18, tensile strength=about 9,000 to 9,500 p.s.i., tensile elongation=about 50 to 100%, and softening temperature=100%. Films of the phenoxy resin suitable for use with curved glass surfaces found in laminated safety lenses have a thickness of about .001 to .008″ or more. The preferred thickness is about .008″ because of improved shock resistance, tear resistance and anti-spalling properties of the laminate.

Referring now to the drawing there is shown in FIGURE 1 a thin film 10 of phenoxy resin. The film has been contacted with a monomer which forms thin layers 12 and 13 on either side of the phenoxy resin film. After being contacted with the monomer for a period of time the phenoxy film 10 absorbs the liquid and forms zones 14 and 15 of impregnated material. The depth of penetration of the monomer into the film surface depends upon contact time, composition of the monomer, temperature and phenoxy resin properties. In general, the contacting step may be carried out by immersing the film 10 for a few seconds to several minutes in the liquid monomer the optimum contact time depending on the dissolution rate of phenoxy in the monomer and the interlayer thickness desired in the laminate to prevent further penetration. The film 10 is placed between silicate layers as shown in FIGURE 2. A curved surface is shown in which an outer glass lens 20 and an inner glass lens 22 have common curves 24 and 26 for each lens. These are normally spherical base curves which are uniformly mated and these adjacent surfaces 24 and 26 are usually polished optical surfaces. The outer surface of lens member 20 may be ground to a different curve from that of the inner surface 24 to provide a power for the optical element. The inner surface of lens member 22 may be ground to the same curve as surface 26 or this surface may be ground to provide a negative lens such as shown by Clave et al. in U.S. Patent 2,618,200, or the surface of the inner lens 22 may be ground to a toric curve as shown in the U.S. Patent 1,948,636 to Tillyer.

EXAMPLE I

A phenoxy resin film approximately .008" in thickness is immersed for about 15 seconds in a liquid monomer consisting essentially of triallyl phosphate (TAP) containing about 3% benzoyl peroxide catalyst. The film is removed from the liquid and placed between two curved pieces of silicate glass having mating surfaces with a common spherical base curve. The laminate is pressed in a clamping fixture and heated at about 80° C. for one hour. At the end of this time a bubble-free homogenous laminated lens was formed including silicate inner and outer members and an interlayer comprising the phenoxy resin film impregnated with poly(triallyl phosphate). The surface of the interlayer adjacent the glass is essentially pure TAP polymer and the center portion of the phenoxy film 10 remains essentially unchanged from its untreated state. The surface portions 14 and 15 of the phenoxy film contain a gradient of the second resin with increasing TAP concentration towards the surface. The thermoplastic phenoxy film was no longer heat fusible due to the effects of the thermosetting triallyl phosphate polymer. The laminated silicate glass lens was edged on an abrasive wheel bevel-edger to a commercial safety lens shape and then subjected to the impact of steel balls of increasing diameter from a height of 50 inches. The lens broke with a 1⅛ inch diameter ball; however, all glass particles were held intact by the phenoxy-TAP interlayer.

EXAMPLE II

A 0.010" sheet of phenoxy resin was immersed in vinyl cyclohexene dioxide containing 0.15 percent perchloric acid for 30 minutes at room temperature whereupon the sheet became swollen and tacky through absorption of the epoxy monomer. Excess monomer on the surface was removed and the sheet was placed between two 1.5 mm. plano power silicate glass lenses, pressed with a spring clamp, then placed in an oven at 60° C. for 12 hours to provide a firmly bonded laminate.

EXAMPLE III

A 0.010" sheet of phenoxy resin was immersed in a mixture of 70 pts. of diallyl phenyl phosphonate and 30 pts. of diallyl chloromethyl phosphonate monomer containing 3 percent of benzoyl peroxide. After immersion for 15 minutes the film was placed between two 1.5 mm. thick flat sheets of window glass, pressed to remove air bubbles and placed into an oven at 80° C. for 30 minutes and 1 hour at 100° C. A firmly bonded glass laminate resulted.

Several advantages have been found in the present invention. After contacting the phenoxy resin film with a compatible liquid monomer the phenoxy resin becomes tacky and is easily bonded to the silicate surfaces without retention of gas bubbles at the interfacial area between the film and the silicate material. Also the phenoxy resin film tends to swell due to absorption of the monomer, thus rendering the film easily conformable to curved lens elements. The triallyl phosphate monomer is so highly compatible with the phenoxy resin that it will dissolve the phenoxy resin at about 30 weight percent phenoxy. Consequently, contacting the phenoxy resin with a rapidly absorbed monomer liquid for an excessive period of time is considered undesirable. Immersion times in triallyl phosphate of more than about one minute tend to make the phenoxy film extremely tacky and many of the desired mechanical properties of the film will be lost. On the other hand, the phenoxy film may be immersed in methacrylate monomer for 10 minutes or longer as this monomer dissolves phenoxy resin at a such slower rate. It is important to note that most of the monomers used herein by themselves form extremely brittle polymers which have poor mechanical properties, especially for use in laminated safety lenses. The tear strength, elongation and shock resistance properties of the phenoxy base film are retained using the process of this invention while the advantages of bonding with a tacky surface having a great affinity of silicate materials are retained. Another significant feature of the process is the use of low temperatures permitting its use in laminating of thermosetting plastic lens elements. The contacting step in which the monomer is absorbed into the phenoxy film surface may be carried out at ambient room temperature at about 20° C. if desired. Longer contact times may be necessary at lower temperatures for this step. The curing or polymerization of the absorbed monomer to provide an impregnated phenoxy resin film may take place over a wide range of temperatures and times depending upon the monomer used and whether the monomer is properly catalyzed during curing.

Several monomers have been found to work successfully in the present invention. Allyl methacrylate, methyl methacrylate, diallylphenyl phosphonate, triallyl phosphate and glycidylmethacrylate have been used successfully as impregnating agents with the phenoxy interlayer and silicate glass layers. Numerous other liquid monomers may be used provided that they are compatible with the phenoxy base resin; such other monomers include diallylallyl phosphonate and ethylene glycol dimethacrylate. Some monomers are thermosetting, while others are thermoplastic. There appear to be no structural limitations on the monomers that may be used except they are compatible with the phenoxy resin to be used as the base material and capable of being polymerized in situ. Preferably the impregnating second resin will be clear, have a relatively high index of refraction, and remain stable. Most of the above monomers may be cured by the addition of a small amount of catalyst and by heating to at least 60° C. for about one hour or more. Also, the phenoxy resin may be impregnated with more than one monomer at a time.

While this invention has been described by specific examples there is no intention to limit the inventive concept except to set forth in the following claims.

We claim:
1. A method for laminating silicate sheets comprising:
   contacting a porous thermoplastic phenoxy resin film, to be disposed between and contact the sheets, with a catalyst and a monomer selected from the group consisting of triallyl phosphate, allyl methacrylate, vinyl cyclohexene dioxide, methyl methacrylate, triallyl citrate, diallyl phenyl phosphate, and mixtures thereof to impregnate the film surfaces in contact with the sheets;
   interposing the impregnated phenoxy resin film between the silicate sheets; and
   thereafter heating the impregnated phenoxy resin to polymerize the monomer in situ and laminate the silicate sheets to the resin.
2. The method of claim 1 wherein the phenoxy resin consists essentially of a condensation reaction product of disphenol A and epichlorohydrin.
3. The method of claim 1 wherein the phenoxy resin film is contacted with the monomer up to about one minute and the monomer is polymerized in situ between silicate glass sheets by heating to at least about 60° C. for at least about one hour.
4. The method of claim 3 wherein the monomer is polymerized by heating with a catalytic amount of benzoyl peroxide for about five hours at about 80° C.
5. A safety lens comprising two mated silica glass sheets:
   each of said sheets having an outside surface and an inside surface;

the inside surface of one sheet being complimentary to the outside surface of the mating sheet;

an intermediate layer of a porous thermoplastic phenoxy resin between the mating surfaces of the glass sheets;

the surfaces of the phenoxy resin in contact with the glass sheets having impregnated therein a catalyst and a monomer selected from the group consisting of triallyl phosphate, allyl methacrylate, vinyl cyclohexene dioxide, methyl methacrylate, triallyl citrate or diallyl phenyl phosphate, and mixtures thereof;

said lens characterized in that the silica sheets are laminated by polymerization of the monomer in situ.

6. The safety lens of claim 5 wherein the phenoxy resin consists essentially of a condensation reaction product of bisphenol A and epichlorohydrin.

References Cited

UNITED STATES PATENTS

| 2,962,471 | 11/1960 | Lang et al. | 156—106 |
| 3,177,090 | 4/1965 | Bayes et al. | 260—830 |
| 3,308,204 | 3/1967 | Bugel et al. | 260—837 |
| 3,310,457 | 3/1967 | Trebilcock | 161—185 |

FOREIGN PATENTS

| 958,938 | 5/1964 | Great Britain. |

ROBERT F. BURNETT, Primary Examiner

W. J. VAN BALEN, Assistant Examiner

U.S. Cl. X.R.

156—99, 313; 161—203, 161; 350—175; 351—159

FO-1050
(5/69)

UNITED STATES PATENT OFFICE
CERTIFICATE OF CORRECTION

Patent No. 3,471,358      Dated Oct. 7, 1969

Inventor(s) Irving B. Lueck and Clarence A. Sheld

It is certified that error appears in the above-identified patent and that said Letters Patent are hereby corrected as shown below:

Col. 2, line 43, change "=100%" to -- 100°C --;

Col. 4, line 3, change "such" to -- much --;
      line 11, change "of" to -- for --;
      line 63, change "disphenol" to -- bisphenol --

SIGNED AND SEALED
NO. 171570

(SEAL)
Attest:

Edward M. Fletcher, Jr.
Attesting Officer

WILLIAM E. SCHUYLER, JR.
Commissioner of Patents